United States Patent [19]

Jackson

[11] 4,278,175
[45] Jul. 14, 1981

[54] GLASS CARRYING RACK

[76] Inventor: Archie A. Jackson, P.O. Box 1332, Silver City, N. Mex. 88061

[21] Appl. No.: 963,048

[22] Filed: Nov. 22, 1978

[51] Int. Cl.³ .............................................. A47F 7/00
[52] U.S. Cl. .............................. 211/41; 224/42.45 R; 296/3
[58] Field of Search ................. 211/41, 86, 13; 296/3; 224/329, 309, 314, 273, 42.45 R, 42.46 R

[56] References Cited

U.S. PATENT DOCUMENTS

| | | |
|---|---|---|
| 242,003 | 5/1881 | Lackey . |
| 1,879,513 | 9/1932 | Rothholz . |
| 2,100,971 | 11/1937 | McDonald ............................ 296/3 |
| 2,518,624 | 8/1950 | Kraft ........................................ 211/13 |
| 2,739,747 | 3/1956 | Lyszczek ........................... 224/42.11 |
| 2,764,331 | 9/1956 | Bigos ............................. 224/42.45 R |
| 2,815,861 | 12/1957 | Schodorf ................................ 211/13 |
| 2,978,270 | 4/1961 | Verheggen ......................... 211/41 X |
| 3,765,713 | 10/1973 | Suitt ........................................ 296/3 |
| 3,891,262 | 6/1975 | Brunel ..................................... 296/3 |
| 4,007,864 | 2/1977 | Hreha ........................... 224/42.46 R |

FOREIGN PATENT DOCUMENTS 1203047  1/1960  France .......................................... 296/3

*Primary Examiner*—Roy D. Frazier
*Assistant Examiner*—Robert W. Gibson, Jr.
*Attorney, Agent, or Firm*—Cushman, Darby & Cushman

[57] ABSTRACT

Disclosed is a portable glass carrying rack which may be easily and quickly attached to a frame on a vehicle, such as a lumber rack or a pickup truck. A plurality of hooks on one end of a plurality of pipes are used to removably attach the rack to the frame. Boards interconnect the pipes and support one face of the glass to be carried. Another board attached to the end of the pipes opposite the hooks has a groove for supporting one edge of the glass. Brackets slidably attached to each of the pipes bias the lower portion of the pipes away from the truck and bias the pipes at a small angle with respect to the vertical in order to help absorb shocks caused by potholes and the like.

9 Claims, 3 Drawing Figures

GLASS CARRYING RACK

This invention relates to a glass carrying rack for transporting plate glass on a vehicle, and more specifically, to such a glass carrying rack which is not bolted to the vehicle and which may be rapidly and easily removed therefrom.

Many people, e.g., construction workers must occasionally transport large pieces of plate glass. Without a special frame or rack, the possibility of glass breakage is fairly high. On the other hand, permanently attaching a glass carrying rack to a construction worker's vehicle is inefficient since the rack is so seldom used.

A number of devices for supporting objects or vehicles are known in the art. U.S. Pat. No. 1,383,324 to Martell discloses a portable rack or frame such as would be used in a drive-in restaurant. Although the disclosed rack may be easily removed from the vehicle, it certainly could not support plate glass or anything, for that matter, while the vehicle is moving. U.S. Pat. No. 2,409,103 to Cameron discloses an automobile luggage carrier which may be detached from a vehicle. However, detachment is an involved process, and such a carrier would not be appropriate for transporting glass. U.S. Pat. Nos. 3,424,487 and 2,739,747 to Pector et al and Lyszczek, respectively, both teach glass transporting racks which are rigidly connected to a vehicle. U.S. Pat. No. 3,913,965 to Muller et al discloses a carrying frame for glass sheets. The frame in Muller et al is designed for transportation by a crane or the like. Thus, none of these references teach a glass carrying rack which may be easily mounted on a vehicle or a frame attached to the vehicle.

The present invention meets the needs of people who must occasionally transport plate glass by providing a portable glass carrying rack which is not bolted to the vehicle and which may be quickly and easily attached to and removed from a vehicle or a frame attached to the vehicle. The present invention includes a plurality of upright supports, each of which has a hook at the top. The hook may be attached, for example, to a lumber rack on the bed of a pickup truck. Boards, interconnecting the upright supports, support one face of the glass sheet. A board interconnecting the bottom of the upright supports has a groove in which one edge of the glass plate rests. A bracket is slidably attached to each of the upright supports in order to bias the rack away from the truck and at a small angle with respect to the vertical.

The fact that the brackets are slidable allows the point at which the bracket contacts the vehicle or the frame to be varied. Without the bracket, the rack would lie against the side of the vehicle thereby scraping it. Also, since the rack and glass thereon would rest nearly vertically, shocks caused by bumps in the road would be applied to the rack nearly parallel to the upright supports. Since the entire force of the bumps would be exerted on one edge of the glass, the possibility of breakage is increased. In fact, the rack may become disengaged from the frame. In the present invention the glass carrying rack is biased at a small angle with respect to the vertical to overcome this problem. Because of this angle, shocks to the rack and glass caused by potholes and the like are transmitted into rotational or horizontal forces. Since the full force is not exerted in the vertical direction, the rack is less likely to become detached from the vehicle. Also, since part of the force is transmitted to a horizontal direction, a portion of the force on the glass with respect to the frame is applied to the face of the glass where it contacts the boards interconnecting the upright supports. Therefore, since the entire force is not applied to the edge of the glass where it contacts the support, the glass is less likely to crack.

These and other objects and advantages of the invention will become more apparent and more readily appreciated from the following detailed description of the presently preferred exemplary embodiment of the invention taken in conjunction with the accompanying drawing, of which:

Figure 1:
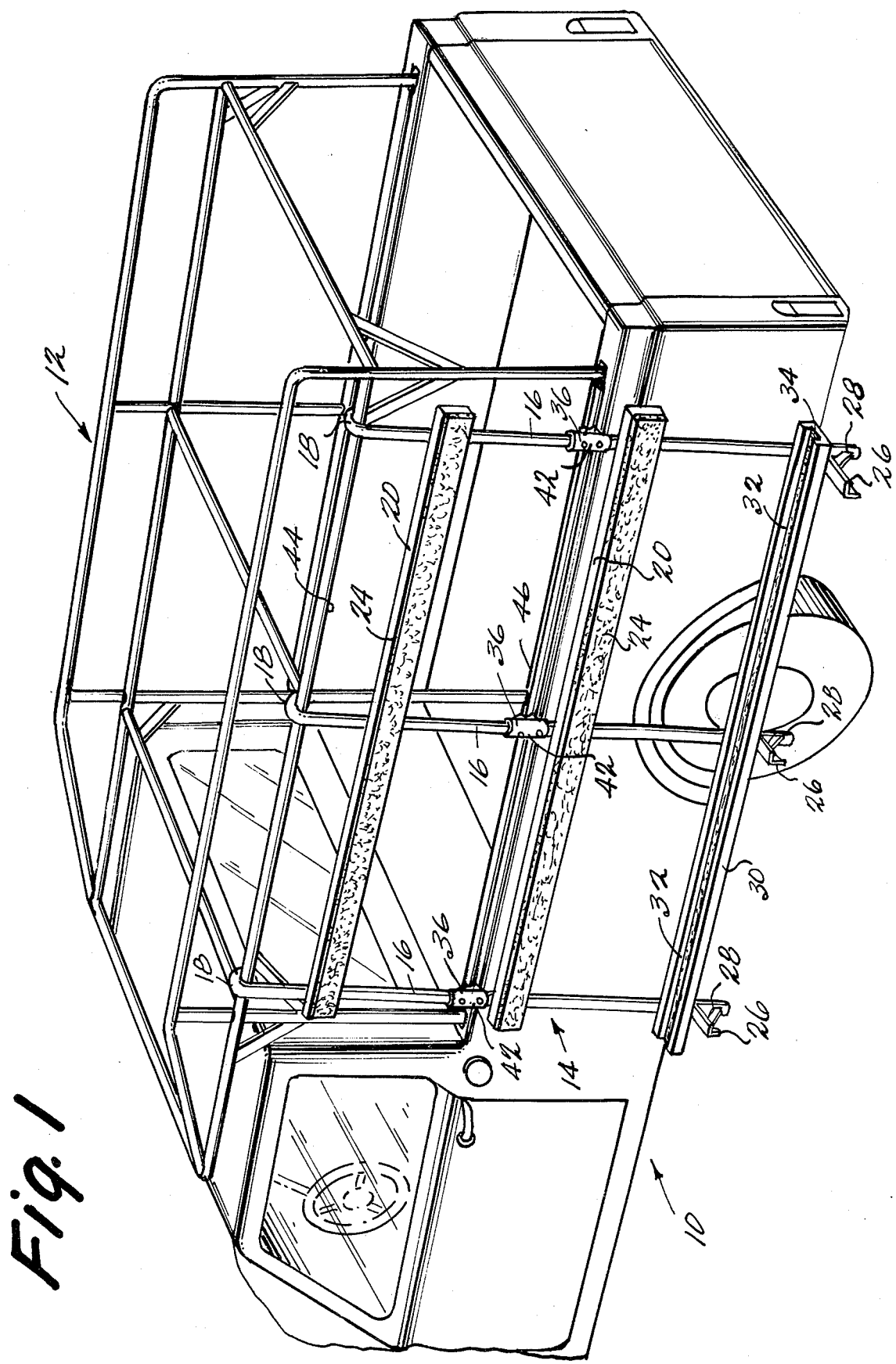
FIG. 1 is a perspective view of the present invention.
Figure 2:
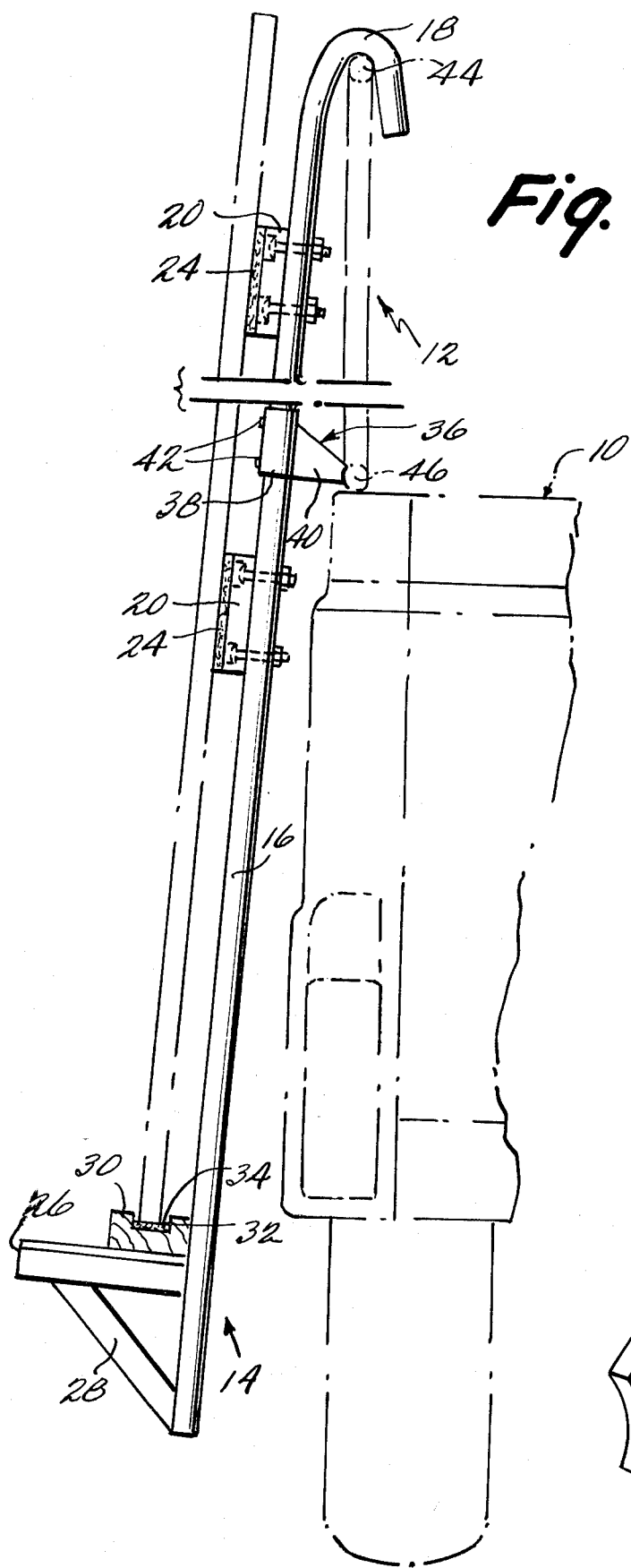
FIG. 2 is a side elevational view of the present invention.

Referring now to FIGS. 1 and 2, a vehicle such as pickup truck 10 has a frame 12 attached thereto. For example, the frame may be a lumber rack or a ladder rack attached to the bed of the pickup truck 10. The glass carrying rack, generally indicated by reference numeral 14, comprises upright supports 16. In the preferred embodiment, the upright supports are three pieces of 1¼ inch diameter pipe. Attached to each upright support 16 are means for supporting the weight of rack 14 consisting of hooks 18. Hooks 18 enable rack 14 to be detachably secured to frame 12. In the preferred embodiment, the curved portion of each hook 18 has a 1½ inch diameter with a 2 inch return. Members 20, providing means for interconnecting upright supports 16, support one face of the plate glass to be carried. In the preferred embodiment, members 20 are 1 inch by 6 inch boards attached to pipes 16 by means of carriage bolts. Applied to the surface of boards 20 are cushioning means 24 for protecting the glass. In the preferred embodiment, cushioning means 24 is carpeting. One extension 26 is welded near the bottom of each of pipes 16 so that each pipe 16 forms a 90° angle with the associated extension 26. In the preferred embodiment, extensions 26 are ⅛ inch by 1 inch angle iron. Braces 28 are welded to and interconnect each extension 26 and pipe 16 in order to strengthen extensions 26. In order to support the bottom edge of the glass being transported, support 30 is attached to extensions 26. In the preferred embodiment, support 30 is a 2 inch by 4 inch wooden member having a dadoed groove 32 in which the edge of the glass rests. The bottom surface of the groove is covered with cushioning means 34, which in the preferred embodiment is carpeting.

Figure 3:
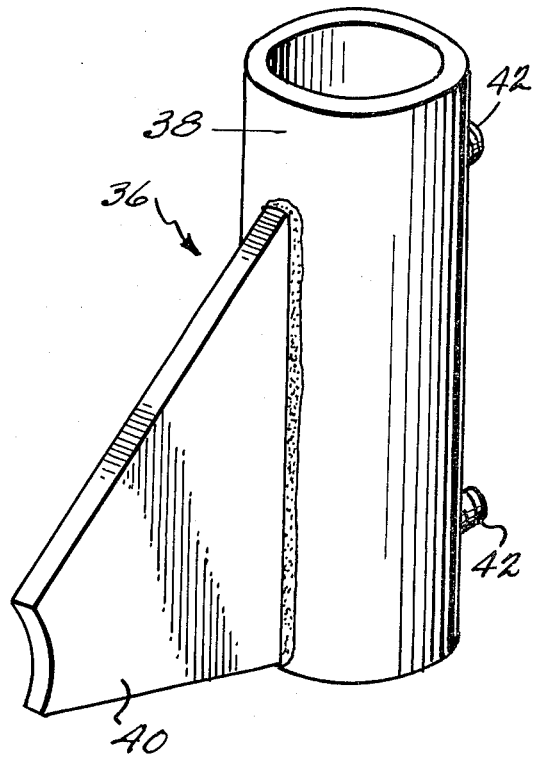
FIG. 3 is an exploded detail of the brackets of the present invention.

One bracket 36 is slidably attached to each pipe 16. As illustrated in FIG. 3, each bracket 36 comprises tubing 38 to which is welded member 40. In the preferred embodiment, pipe 38 has an inner diameter of 1¼ inches so as to be slidable along pipe 16 which has an outer diameter of 1¼ inches. Member 40 is welded to tubing 38. The edge of member 40 opposite the weld is contoured to correspond to the surface of the frame or the truck against which member 40 will rest. Member 40 is sufficiently long to bias pipes 16 away from truck 10 and at a slight angle with the vertical. Set screws 42 lock the position of brackets 36 along pipes 16.

In order to utilize the present invention, hooks 18 are simply attached to the vehicle or the frame such as bar 44 of the frame in FIGS. 1 and 2. Set screws 42 are loosened so that brackets 36 slide freely along pipes 16. The position of each bracket 36 is then adjusted as desired. In FIGS. 1 and 2, bracket 36 is set so that the curved portion of member 40 rests against bar 46 of the frame 12. Set screws 42 are then tightened.

The lower edge of the glass is then positioned in groove 32 of support 30 and the face of the glass is rested upon boards 20. Since upright supports 16 form a slight angle with a vertical, shocks caused by potholes and the like are partially absorbed on the face of the glass plate resting against boards 20 and not entirely on the one edge resting upon support 30. Therefore, the glass is less likely to break. Also, since a portion of the force resulting from the shocks are transferred to the horizontal direction, hooks 18 are less likely to become disengaged from bar 44 when vehicle 10 encounters a pothole.

Although only one exemplary embodiment of this invention has been described in detail above, those skilled in the art readily appreciate that many modifications are possible in the exemplary embodiment without materially departing from the novel teachings and advantages of this invention. Accordingly, all such modifications are intended to be included within the scope of this invention as defined in the following claims.

What is claimed is:

1. A glass carrying rack comprising:
   a frame adapted to be disposed on a vehicle, said frame including a horizontal member;
   a plurality of upright supports;
   means for bearing the weight of said rack consisting of a plurality of hook means, one of said plurality of hook means attached to the top of each of said plurality of upright supports, said hook means detachably securing said plurality of upright supports to said frame horizontal member;
   means interconnecting said plurality of upright supports for supporting said glass; and
   means for biasing said upright supports away from said vehicle and at a small angle with respect to the vertical.

2. Apparatus as in claim 1, wherein said plurality of upright supports and means for bearing the weight of said rack comprise a plurality of pipes, each of said pipes having a bend at one end forming a hook.

3. A glass carrying rack comprising:
   a frame adapted to be disposed on a vehicle, said frame including a horizontal member;
   a plurality of pipes;
   means for supporting the weight of said rack consisting of bends at one end of each of said pipes forming hook means detachably securing said plurality of pipes to said frame horizontal member;
   a plurality of horizontal face supporting means interconnecting said pipes for supporting a face of said glass;
   horizontal edge supporting means attached to said pipes near the end of pipes opposite said bends, said edge supporting means including a base perpendicular to said pipes and walls extending upwardly from the two longest edges of said base, said horizontal edge supporting means for supporting one edge of said glass;
   a plurality of bracket means, one of said bracket means slidably attached to each of said upright supports, said bracket means including abutting means, engaging at least one of said vehicle and said frame at a location for biasing the lower portion of said pipes at a small angle with respect to the vertical and away from said vehicle; and
   a plurality of means for fixing the position of said plurality of bracket means on said plurality of pipes.

4. A glass carrying rack comprising:
   a frame adapted to be disposed on a vehicle;
   a plurality of upright supports;
   means for bearing the weight of said rack consisting of a plurality of hook means, one of said plurality of hook means attached to the top of each of said plurality of upright supports, said hook means detachably securing said plurality of upright supports to said frame;
   means interconnecting said plurality of upright supports for supporting said glass; and
   means for biasing said upright supports away from said vehicle and at a small angle with respect to the vertical including a plurality of brackets, each of said brackets being attached to a different one of said supports, each of said brackets having a first portion slidably attached to one of said supports, and a second portion, said second portion including a flat plate having a first edge attached to said first portion and a second edge opposite said first edge, said second edge being curved for engagement with said frame.

5. Apparatus as in claim 1 or 4, wherein said means for supporting said glass comprises:
   a plurality of horizontal face supporting members attached to said supports; and
   a horizontal edge supporting member attached to said upright supports near the end of said upright supports opposite said bearing means, said edge supporting means including a base perpendicular to said upright supports and walls extending upward from the two longest edges of said base.

6. Apparatus as in claim 5, wherein said face and edge supporting members further comprise cushioning means attached to the surface of said face supporting members opposite said upright supports and to the upper surface of said base.

7. Apparatus as in claim 6, wherein said cushioning means is carpeting.

8. A glass carrying rack comprising:
   a frame adapted to be disposed on a vehicle;
   a plurality of upright supports;
   means for supporting the weight of said rack consisting of a plurality of hook means, one of said plurality of hook means attached to the top of each of said plurality of upright supports, said hook means detachably securing said plurality of supports to said frame;
   a plurality of horizontal face supporting means interconnecting said supports for supporting a face of said glass;
   horizontal edge supporting means attached to said pipes near the end of pipes opposite said bends, said edge supporting means including a base perpendicular to said pipes and walls extending upwardly from the two longest edges of said base, said horizontal edge supporting means for supporting one edge of said glass;
   means, attached continuously along the surface of said face supporting means opposite said upright supports and continuously along the upper surface of said base, for cushioning said glass; and
   means for biasing said upright supports away from said vehicle and at a small angle with respect to the vertical including a plurality of brackets, each of said brackets being attached to a different one of said supports, each of said brackets having a first portion slidably attached to one of said supports, and a second portion, said second portion including a flat plate having a first edge attached to said first portion and a second edge, opposite said first edge, said second edge being curved for engagement with said frame.

9. Apparatus as in claim 1 or 8, wherein said biasing means comprises:

a plurality of bracket means, one of said bracket means slidably attached to each of said upright supports, said bracket means including abutting means, engaging at least one of said vehicle and said frame at a location for biasing the lower portion of said upright supports at a small angle with respect to the vertical and away from said vehicle; and a plurality of means for fixing the position of said plurality of bracket means on said plurality of upright supports.

* * * * *